(12) United States Patent
Hsieh et al.

(10) Patent No.: US 6,366,637 B1
(45) Date of Patent: Apr. 2, 2002

(54) METHODS AND APPARATUS FOR GENERATING THIN-SLICE IMAGING DATA ON A MULTI-SLICE IMAGING SYSTEM

(75) Inventors: Jiang Hsieh, Brookfield; Jianying Li, New Berlin, both of WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/566,018

(22) Filed: May 8, 2000

(51) Int. Cl.[7] .................................................. A61B 6/03
(52) U.S. Cl. ................................... 378/19; 378/15; 378/4
(58) Field of Search ............................... 378/4, 8, 15, 16, 378/19, 62

(56) References Cited

U.S. PATENT DOCUMENTS

| | | | |
|---|---|---|---|
| 5,262,946 A | * 11/1993 | Heuscher | 378/15 |
| 5,864,598 A | 1/1999 | Hsieh et al. | 378/4 |
| 6,061,419 A | * 5/2000 | Hsieh et al. | 378/4 |
| 6,243,438 B1 | * 6/2001 | Nahaliel et al. | 378/19 |

* cited by examiner

Primary Examiner—David V. Bruce
(74) Attorney, Agent, or Firm—Carl B. Horton, Esq.; Armstrong Teasdale LLP

(57) ABSTRACT

A method for reducing slice thickness of a computed tomography imaging system including a source configured to direct an x-ray beam through an object toward a plurality of rows of detector elements configured to collect projection data in slices. The method includes steps of obtaining imaging data from a pair of adjacent rows, each of the adjacent rows having an outer edge; deconvolving at least a portion of the imaging data obtained from an area bounded by the adjacent row outer edges; and combining the deconvolved imaging data to obtain a slice sensitivity profile for the adjacent row pair. This method allows a multi-slice imaging system user to implement imaging data deconvolution to reduce slice thickness to less than one millimeter. Thus image resolution is improved without having to modify hardware in existing multi-slice imaging systems.

27 Claims, 5 Drawing Sheets

METHODS AND APPARATUS FOR GENERATING THIN-SLICE IMAGING DATA ON A MULTI-SLICE IMAGING SYSTEM

BACKGROUND OF THE INVENTION

This invention relates generally to tomographic imaging, and more particularly to methods and apparatus for generating computed tomographic imaging data using a multi-slice imaging system.

In at least one known computed tomography (CT) imaging system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two-dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

In known CT systems the x-ray beam is projected from the x-ray source through a pre-patient collimator that defines the x-ray beam profile in the patient axis, or z-axis. The collimator typically includes x-ray-absorbing material with an aperture therein for restricting the x-ray beam.

CT imaging systems typically provide image resolution within limitations imposed by such factors as collimator aperture size and slice thickness. A minimum slice thickness for at least one CT system is 1.25 millimeters, as determined primarily by detector element pitch size. In order to improve image resolution, it is desirable to reduce slice thickness to less than 1 millimeter, and to achieve such reduction with minimal impact on imaging system hardware.

It is known to reduce slice thickness of a single-slice imaging system by irradiating a portion of a detector element and deconvolving imaging data, for example, projection data or image data, to reduce the full-width-at-half-maximum (FWHM) interval of a reconstructed slice profile. It is desirable to achieve similar slice-width reductions on multi-slice systems without impacting system hardware. Difficulties can arise, however, in implementing this approach for a multi-slice imaging system, because multi-slice sampling is limited, for example, by joints between adjacent detector rows.

It would be desirable to use double-slice imaging data collection and deconvolution techniques to reduce slice thickness on a multi-slice imaging system without having to change system hardware.

BRIEF SUMMARY OF THE INVENTION

There is therefore provided, in one embodiment, a method for reducing slice thickness of a computed tomography imaging system including a source configured to direct an x-ray beam through an object toward a plurality of rows of detector elements configured to collect projection data in slices, the method including the steps of obtaining imaging data from a pair of adjacent rows, each of the adjacent rows having an outer edge; deconvolving at least a portion of the imaging data obtained from an area bounded by the adjacent row outer edges; and combining the deconvolved imaging data to obtain a slice sensitivity profile for the adjacent row pair.

The above-described method allows a multi-slice imaging system user to implement imaging data deconvolution to reduce slice thickness to less than one millimeter. Thus image resolution is improved without having to modify hardware in existing multi-slice imaging systems.

DETAILED DESCRIPTION OF THE INVENTION

Figure 1:
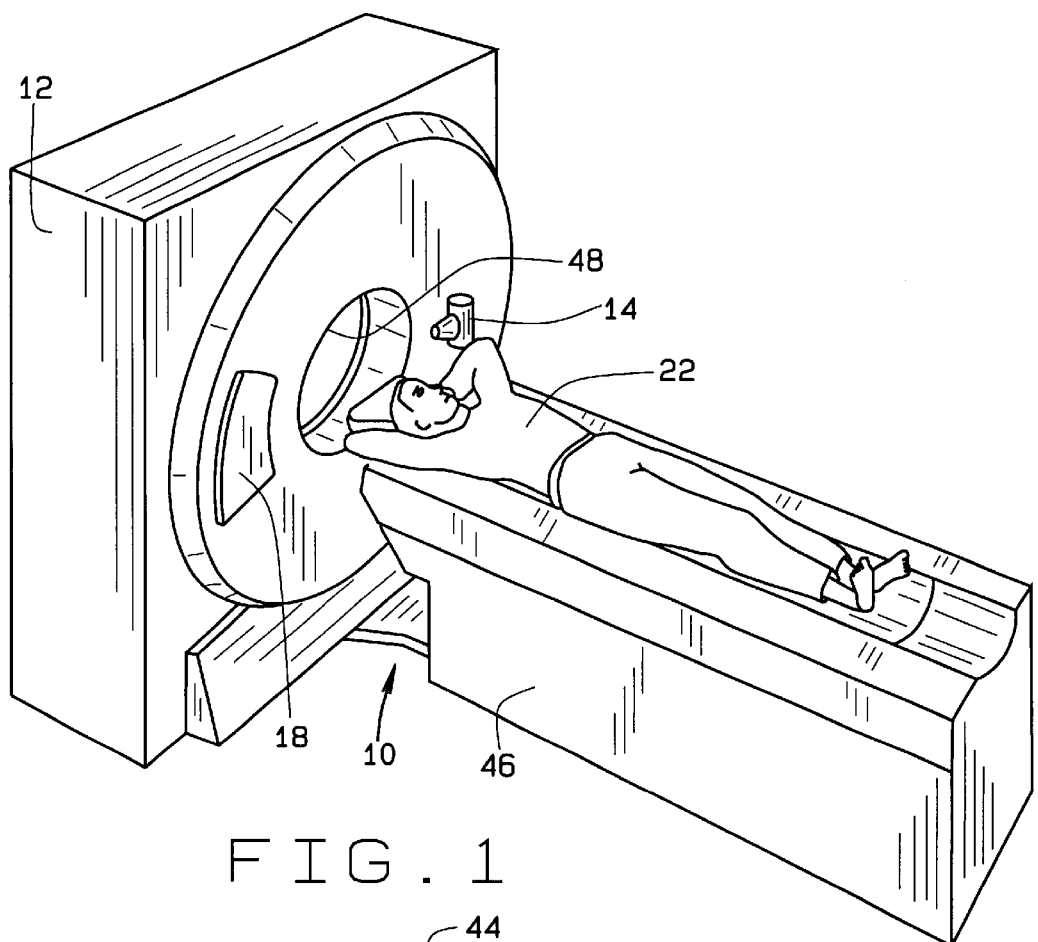
FIG. 1 is a pictorial view of a CT imaging system.
Figure 2:
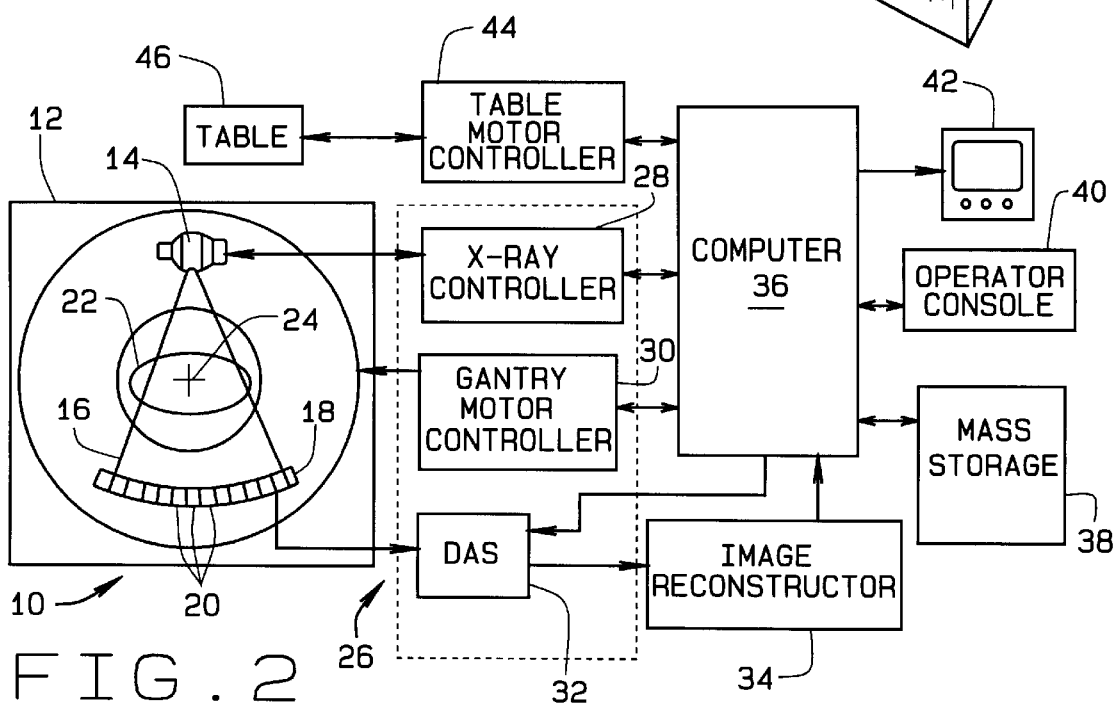
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object 22, for example, a medical patient. Detector array 18 may be fabricated in a single slice or multi-slice configuration. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10.

Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. One such parameter supplied by the operator is a nominal slice thickness for data acquisition. An associated cathode ray tube display 42 allows the operator to observe the reconstructed image and other data from computer 36. The operator-supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
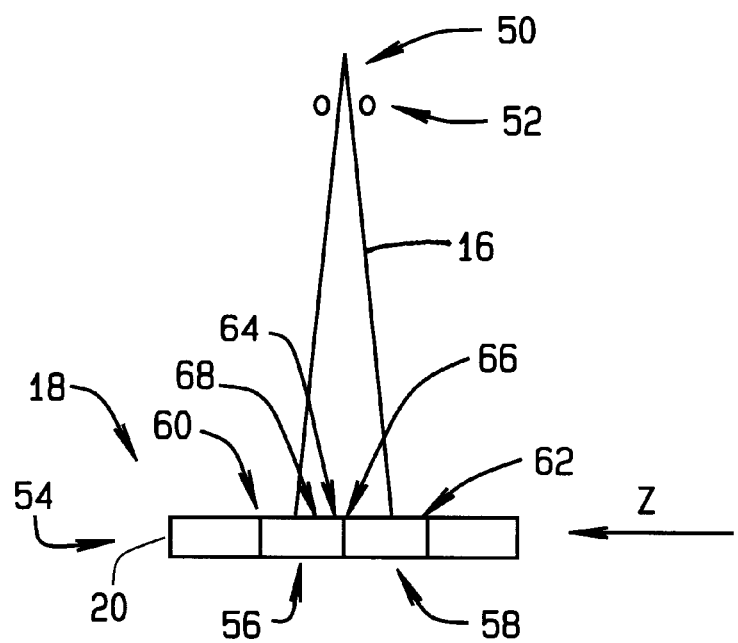
FIG. 3 is a diagram illustrating geometry of an x-ray beam striking a typical multi-slice detector array.

In a typical multi-slice system and referring to FIG. 3, x-ray beam 16 emanates from a focal spot 50 of source 14 and is projected through a pre-patient collimator 52 that defines beam 16 profile in the z-axis. Collimated beam 16 is projected toward detector array 18, which includes a plurality of rows 54, for example, four rows 54 of detector elements 20. Adjacent rows 56 and 58 are detector array 18 center rows having outer edges 60 and 62 respectively. An inner edge 64 of row 56 is adjacent to an inner edge 66 of row 58.

In one embodiment, a method for reducing imaging system 10 slice thickness includes obtaining imaging data (e.g. projection data or image data generated from projection data) from a pair of adjacent rows 54, for example, center rows 56 and 58. More particularly, beam 16 is directed to irradiate a portion of an area 68 bounded by left center detector row 56 outer edge 60 and right center detector row 58 outer edge 62. For example, beam 16 is collimated by collimator 52 such that beam 16 is contained within a portion of area 68.

Directing beam 16 onto center rows 56 and 58 and obtaining imaging data as above described effectively reduces slice thickness for some clinical applications. For example, where a full-width-at-half-maximum (FWHM) interval of system 10 is 1.25 millimeters, slice thickness is reduced to a FWHM of 0.8 to 0.9 millimeters. Further reductions are limited by x-ray focal spot 50 size and system 10 geometry (i.e. distance between collimator 52 and focal spot 50 and distance between detector elements 20 and focal spot 50).

Figure 4:
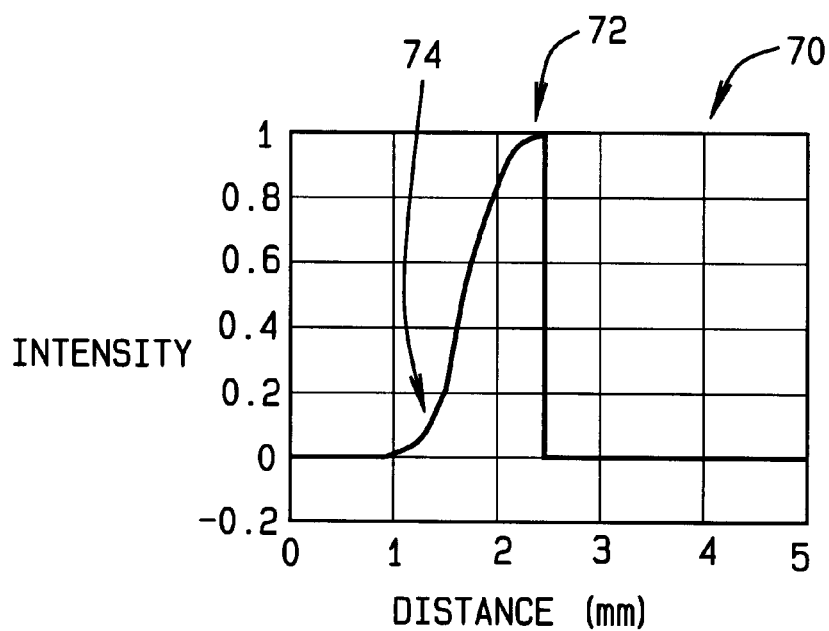
FIG. 4 is an illustration of a typical slice sensitivity profile for a left center detector element row when irradiated as shown in FIG. 3.
Figure 5:
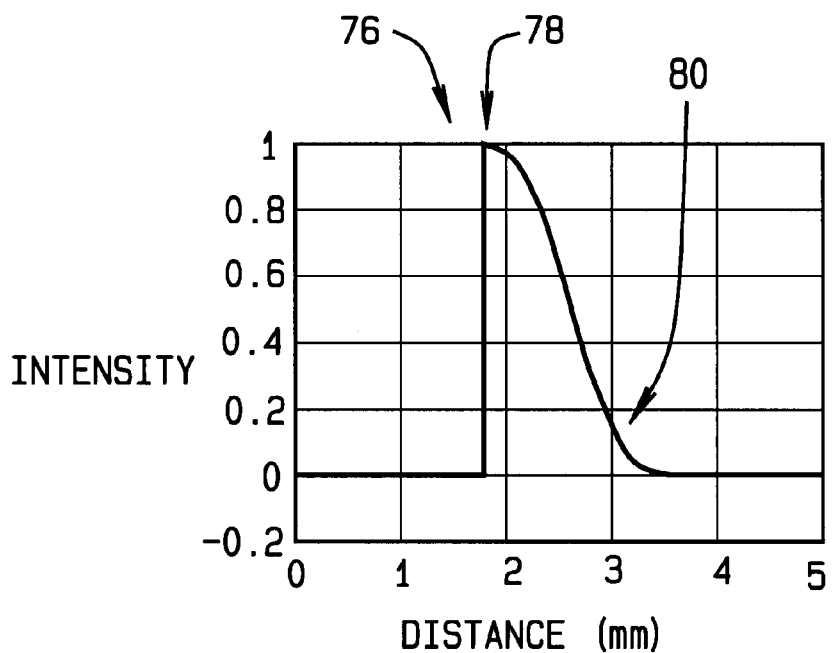
FIG. 5 is an illustration of a typical slice sensitivity profile for a right center detector element row when irradiated as shown in FIG. 3.

For many clinical applications it is desirable to achieve a slice thickness of 0.5 millimeters. Thus in another embodiment, at least a portion of imaging data obtained from area 68 is deconvolved. More particularly, FIG. 4 illustrates a typical slice sensitivity profile 70 for a left center row such as row 56 when irradiated as shown in FIG. 3. Sensitivity profile 70 closely approximates a step function at a distance 72 where a joint, i.e. inner edges 64 and 66 respectively of rows 56 and 58, defines a beam 16 boundary. Where defined by collimator 52, beam. 16 boundary falls off gradually, for example, around a distance 74, as outer edge 60 is approached from the right. Similarly and referring to FIG. 5, a typical slice sensitivity profile 76 for a right center row such as row 58 closely approximates a step function at a distance 78 where inner edge 64 meets inner edge 66. Where defined by collimator 52, beam 16 boundary falls off gradually, for example, around a distance 80, as outer edge 62 is approached from the left.

The above-described dissimilarities between the step-function-approximated and collimator-defined beam 16 boundaries make it difficult to compensate effectively for undershoot if deconvolution is applied to multi-slice imaging data as known for single-slice applications. Thus in one embodiment, deconvolution is applied to a portion of the imaging data, e.g. deconvolution is applied separately to each adjacent row 56 and 58. More particularly and for example, deconvolution for left center row 56 is applied toward left outer edge 60, and deconvolution for right center row 58 is applied toward right outer edge 62, using relationships written as:

$$P'_{1A}(i) = \sum_{k=0}^{N} w_{kA} P_{1A}(i-k) \qquad (1)$$

$$P'_{1B}(i) = \sum_{k=0}^{N} w_{kB} P_{1B}(i+k) \qquad (2)$$

where $P_{1A}$ and $P_{1B}$ are original imaging data samples for a left center detector row 1A and a right center detector row 1B respectively, $P'_{1A}$ and $P'_{1B}$ are modified imaging data samples for left center detector row 1A and right center detector row 1B respectively, and $w_{kA}$ and $w_{kB}$ are deconvolution kernel points.

Figure 6:
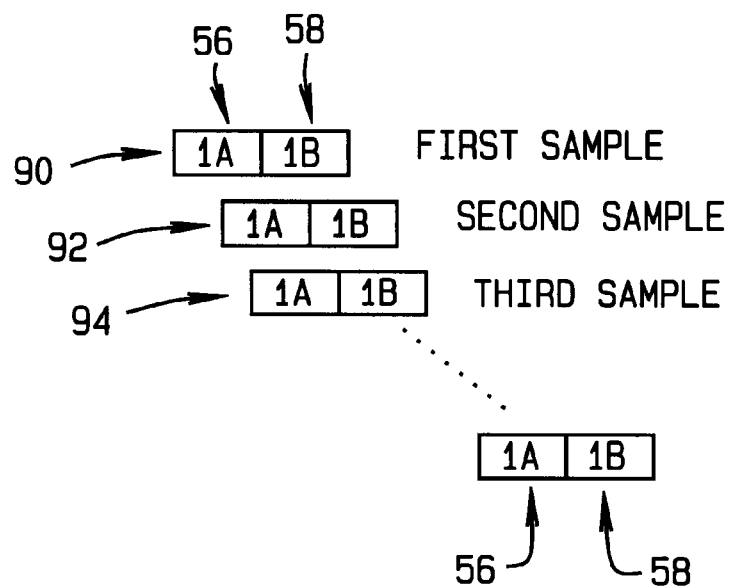
FIG. 6 is a diagram of a multi-slice sampling pattern according to one embodiment.

Because original slice sensitivity profiles of, e.g., rows 56 and 58 typically are asymmetric, deconvolution results are improved when all data samples used in a deconvolution are from the same row 54, for example, as described above in Equations (1) and (2). Thus in one embodiment a sampling pattern for, e.g., an axial scan is performed as shown in FIG. 6. After an imaging data sample 90 is obtained, detector array 18 is incremented in the z-axis by a uniform interval, for example, one half of the nominal slice thickness of a row 54, such that new samples 92 and 94, for example, from row 56 at least partially overlap, e.g. straddle, previous samples taken from row 56.

Figure 7:
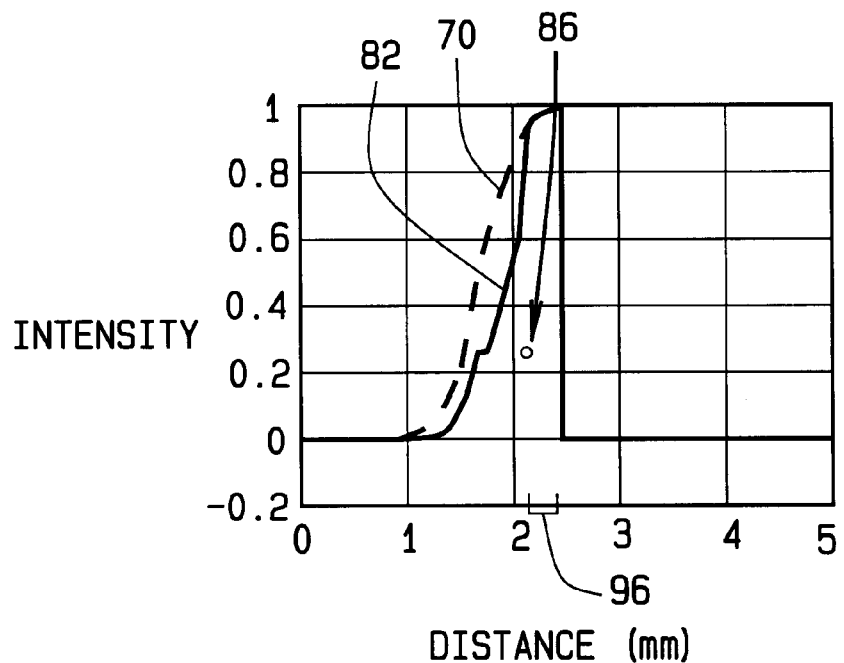
FIG. 7 is an illustration of the left center detector slice sensitivity profile of FIG. 4 deconvolved in accordance with one embodiment.
Figure 8:
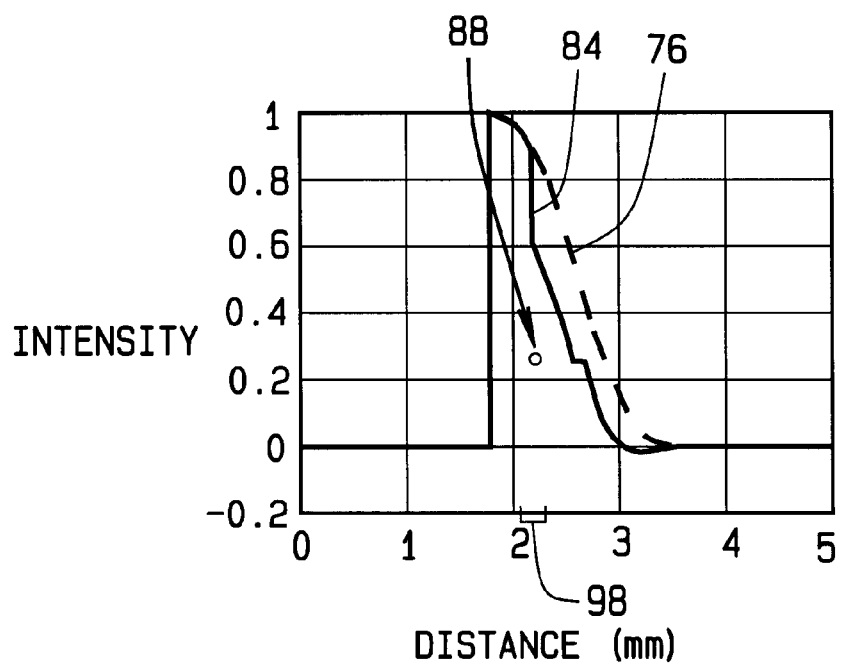
FIG. 8 is an illustration of the right center detector slice sensitivity profile of FIG. 5 deconvolved in accordance with one embodiment.

FIGS. 7 and 8 respectively illustrate slice sensitivity profiles 70 and 76 deconvolved in the above-described manner. In the embodiment shown in FIGS. 7 and 8, deconvolved sensitivity profiles 82 and 84 are obtained using a three-point deconvolution kernel. In other embodiments, kernels of different sizes are used.

When one-sided deconvolution is used as described above, centroids of deconvolved slices are shifted compared to original slice profiles. (Thus, for example, an apparent overlap shown in FIG. 6 of first sample 90 of row 58 over third sample 94 of row 56 is changed through deconvolution.) As shown in FIGS. 7 and 8, deconvolution according to one embodiment shifts a row 56 centroid 86 in a rightward direction while a row 58 centroid 88 is shifted leftward.

Figure 9:
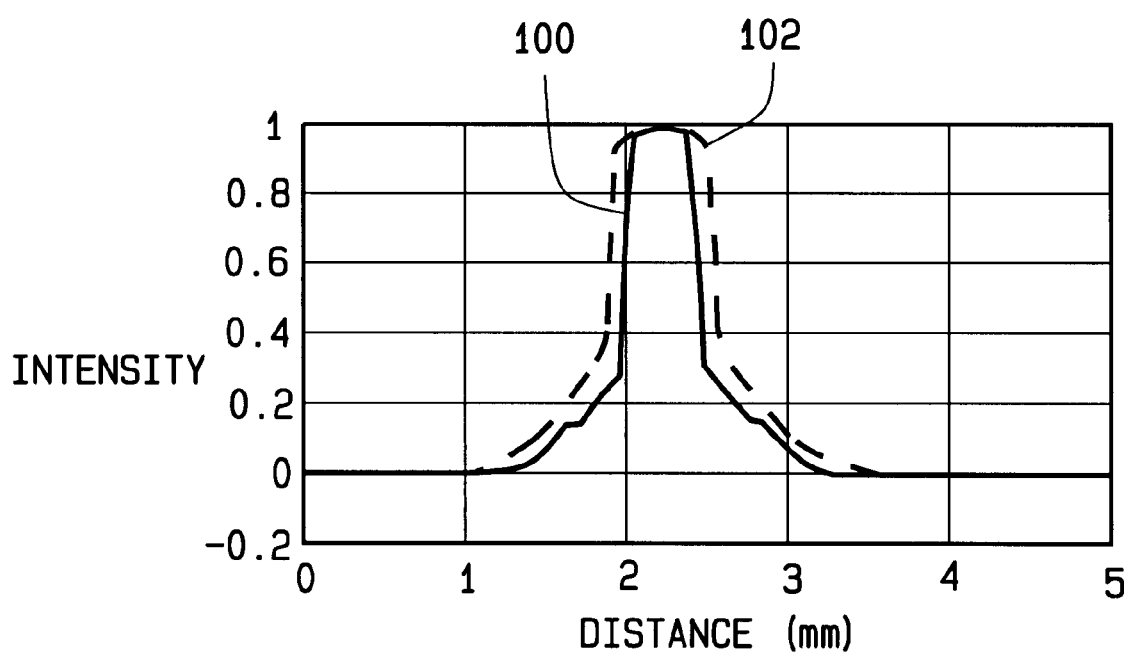
FIG. 9 is a graph of a combined slice sensitivity profile obtained according to one embodiment.

Thus in one embodiment and referring to FIGS. 7 and 8, the deconvolved imaging data for row 56 is shifted rightward by a difference 96 in row 56 centroid 86 location before and after deconvolution. Similarly, deconvolved data for row 58 is shifted leftward by a difference 98 in row 58 centroid 88 location before and after deconvolution. The deconvolved and shifted imaging data from rows 56 and 58 is combined to obtain a slice sensitivity profile 100 as shown in FIG. 9. A combined slice profile 102 from rows 56 and 58 before deconvolution also is indicated in FIG. 9.

Thus the above-described method allows a multi-slice system user to achieve FWHM intervals as small as 0.64 millimeters on a system with an original FWHM of 1.25 millimeters. Thus slice thickness is reduced and image resolution is improved without hardware changes.

Although particular embodiments of the invention have been described and illustrated in detail, it is to be clearly understood that the same is intended by way of illustration and example only and is not to be taken by way of limitation. In addition, the CT system described herein is a "third generation" system in which both the x-ray source and detector rotate with the gantry. Many other CT systems including "fourth generation" systems wherein the detector is a full-ring stationary detector and only the x-ray source rotates with the gantry, may be used if individual detector elements are corrected to provide substantially uniform responses to a given x-ray beam. Furthermore, the present invention can be practiced with other imaging systems besides CT imaging systems. In some embodiments, the methods described herein are implemented by software, firmware or a combination thereof controlling either computer 36, image reconstructor 34, or both. Furthermore, the invention can be practiced using other processors besides computer 36 and image reconstructor 34.

While the invention has been described in terms of various specific embodiments, those skilled in the art will recognize that the invention can be practiced with modification within the spirit and scope of the claims.

What is claimed is:

1. A method for reducing slice thickness of a computed tomography imaging system including a source configured to direct an x-ray beam through an object toward a plurality of rows of detector elements configured to collect projection data in slices, said method comprising the steps of:
    obtaining imaging data from a pair of adjacent rows, each of the adjacent rows having an outer edge;
    deconvolving at least a portion of the imaging data obtained from an area bounded by the adjacent row outer edges; and
    combining the deconvolved imaging data to obtain a slice sensitivity profile for the adjacent row pair.

2. A method in accordance with claim 1 wherein obtaining imaging data from a pair of adjacent rows includes obtaining imaging data from adjacent center rows of a detector array.

3. A method in accordance with claim 2 further comprising the step of directing the x-ray beam to irradiate a portion of the area bounded by the outer edges of the adjacent row pair.

4. A method in accordance with claim 3 wherein said step of directing the x-ray beam to irradiate a portion of the area bounded by the outer edges of the adjacent row pair comprises collimating the beam to contain the beam within the portion of the area.

5. A method in accordance with claim 1 wherein the step of obtaining imaging data from a pair of adjacent rows comprises the step of obtaining at least partially overlapping imaging data samples.

6. A method in accordance with claim 5 wherein the imaging system is configured to collect projection data along a z-axis, and the step of obtaining at least partially overlapping imaging data samples comprises obtaining samples at uniform intervals along the z-axis.

7. A method in accordance with claim 6 wherein the uniform intervals are half of a nominal row slice thickness of the imaging system.

8. A method in accordance with claim 1 wherein the step of deconvolving at least a portion of the imaging data obtained from an area bounded by the adjacent row outer edges comprises the step of separately deconvolving the imaging data obtained from each adjacent row.

9. A method in accordance with claim 8 wherein the step of separately deconvolving the imaging data obtained from each adjacent row comprises deconvolving the imaging data using relationships written as:

$$P'_{1A}(i) = \sum_{k=0}^{N} w_{kA} P_{1A}(i-k)$$

$$P'_{1B}(i) = \sum_{k=0}^{N} w_{kB} P_{1B}(i+k)$$

where $P_{1A}$ and $P_{1B}$ are original imaging data samples for a left center detector row 1A and a right center detector row 1B respectively, $P'_{1A}$ and $P'_{1B}$ are modified samples for the left center detector row 1A and the right center detector row 1B respectively, and $w_{kA}$ and $w_{kB}$ are deconvolution kernel points.

10. A method in accordance with claim 8 wherein the step of separately deconvolving the imaging data obtained from each adjacent row comprises the step of shifting the deconvolved imaging data from each of the adjacent rows by a difference between a row imaging data centroid location before deconvolution and a row imaging data centroid location after deconvolution.

11. A method in accordance with claim 1 wherein the step of combining the deconvolved imaging data to obtain a slice sensitivity profile for the adjacent row pair comprises the step of shifting the deconvolved imaging data by at least one difference in imaging data centroid location.

12. A method in accordance with claim 1 wherein the step of obtaining imaging data from a pair of adjacent rows comprises the step of performing an axial scan.

13. A method in accordance with claim 1 wherein the step of obtaining imaging data from a pair of adjacent rows comprises the step of performing a helical scan.

14. A method for reducing slice thickness of a computed tomography imaging system including a source configured to direct an x-ray beam through an object toward a plurality of rows of detector elements configured to collect projection data in slices, said method comprising the steps of:
    directing the x-ray beam to irradiate a portion of an area between outer edges of two adjacent center rows of the detector array such that the beam is contained within the area;
    obtaining imaging data from the two adjacent rows;
    deconvolving at least a portion of the imaging data obtained from an area bounded by the adjacent row outer edges; and
    combining the deconvolved imaging data to obtain a slice sensitivity profile for the adjacent row pair.

15. An imaging system comprising a source and a plurality of rows of detector elements configured to collect projection data in slices, said rows comprising a pair of adjacent rows, each of said adjacent rows having an outer edge, said system configured to:
    obtain imaging data from said pair of adjacent rows;
    deconvolve at least a portion of the imaging data obtained from an area bounded by said adjacent row outer edges; and
    combine the deconvolved imaging data to obtain a slice sensitivity profile for said adjacent row pair.

16. A system in accordance with claim 15 further comprising a detector array, and wherein said adjacent rows comprise center rows of said detector array.

17. A system in accordance with claim 16 further configured to direct an x-ray beam to irradiate a portion of the area bounded by said outer edges of said adjacent row pair.

18. A system in accordance with claim 17 further comprising a collimator, said system configured to collimate the beam to contain the beam within the portion of the area.

19. A system in accordance with claim 15 wherein being configured to obtain imaging data from a pair of adjacent rows comprises being configured to obtain at least partially overlapping imaging data samples.

20. A system in accordance with claim 19 further configured to obtain at least partially overlapping samples at uniform intervals along a z-axis.

21. A system in accordance with claim 20 wherein the uniform intervals are half of a nominal row slice thickness of said imaging system.

22. A system in accordance with claim 15, said system being configured to deconvolve at least a portion of the imaging data obtained from an area bounded by said adjacent row outer edges comprising being configured to separately deconvolve the imaging data obtained from each said adjacent row.

23. A system in accordance with claim 22 wherein being configured to separately deconvolve the imaging data obtained from each said adjacent row comprises being configured to deconvolve the imaging data using relationships written as:

$$P'_{1A}(i) = \sum_{k=0}^{N} w_{kA} P_{1A}(i-k) \quad (1)$$

$$P'_{1B}(i) = \sum_{k=0}^{N} w_{kB} P_{1B}(i+k) \quad (2)$$

where $P_{1A}$ and $P_{1B}$ are original imaging data samples for a left center detector row 1A and a right center detector row 1B respectively, $P'_{1A}$ and $P'_{1B}$ are modified samples for the left center detector row 1A and the right center detector row 1B respectively, and $w_{kA}$ and $w_{kB}$ are deconvolution kernel points.

24. A system in accordance with claim 22 wherein being configured to separately deconvolve the imaging data obtained from each said adjacent row comprises being configured to shift the deconvolved imaging data from each of said adjacent rows by a difference between a row imaging data centroid location before deconvolution and a row imaging data centroid location after deconvolution.

25. A system in accordance with claim 15 wherein being configured to combine the deconvolved imaging data to obtain a slice sensitivity profile for said adjacent row pair comprises being configured to shift the deconvolved imaging data by at least one difference in imaging data centroid location.

26. A system in accordance with claim 15 wherein being configured to obtain imaging data from said pair of adjacent rows comprises being configured to perform an axial scan.

27. A system in accordance with claim 15 wherein being configured to obtain imaging data from said pair of adjacent rows comprises being configured to perform a helical scan.

* * * * *